United States Patent

Gancy et al.

[11] 4,284,611
[45] Aug. 18, 1981

[54] AQUEOUS PHOSPHATE-STABILIZED POLYALUMINUM SULFATE SOLUTIONS AND PREPARATION THEREOF

[75] Inventors: Alan B. Gancy, Syracuse; Christian A. Wamser, Camillus, both of N.Y.

[73] Assignee: Allied Chemical Corporation, Morris Township, Morris County, N.J.

[21] Appl. No.: 60,260

[22] Filed: Jul. 25, 1979

[51] Int. Cl.$^3$ .............................................. C01B 25/36
[52] U.S. Cl. .................................. 423/308; 210/716; 423/305; 423/309; 423/462; 423/556
[58] Field of Search ............... 423/305, 556, 308, 309, 423/462; 210/716

[56] References Cited

U.S. PATENT DOCUMENTS 4,131,545  12/1978  Redmayne et al. .................. 423/305

FOREIGN PATENT DOCUMENTS 372246  3/1923  Fed. Rep. of Germany.
49-40792  11/1974  Japan.

Primary Examiner—O. R. Vertiz
Assistant Examiner—Wayne A. Langel
Attorney, Agent, or Firm—Thomas D. Hoffman

[57] ABSTRACT

A physically and functionally stable solution for water treatment comprises an about 1.2-2.7 molar aqueous phosphate-stabilized polyaluminum sulfate solution of a composition having the formula $$Al(OH)_x(SO_4)_y(H_2PO_4)_z$$

wherein
x is about 1.2 to 1.62;
y is about 0.595 to 0.87; and
z is about 0.06 to 0.19 with the proviso that the sum of $x+2y+z$ is 3. The aqueous phosphate-stabilized polyaluminum sulfate solution can be prepared by reacting alumina hydrate with phosphoric acid and contacting the reacted alumina hydrate with an aqueous polyaluminum sulfate solution. Alternatively, the aqueous phosphate-stabilized polyaluminum sulfate solution can be prepared by reacting an aqueous overbasified polyaluminum sulfate phosphate solution with an aqueous aluminum sulfate solution.

15 Claims, No Drawings

AQUEOUS PHOSPHATE-STABILIZED POLYALUMINUM SULFATE SOLUTIONS AND PREPARATION THEREOF

DESCRIPTION

1. Field of the Invention

The invention relates to phosphate-stabilized aqueous solutions of polyaluminum sulfate, useful for water treatment; and to processes for their preparation.

2. Background of the Invention

Schmatolla in German Pat. No. 372,246, issued Mar. 26, 1923, teaches that $Al(OH)SO_4$ aqueous solutions (8 to 10 weight percent $Al_2O_3$) are unstable to precipitation but that addition of 0.266 to 0.333 weight percent $H_3PO_4$ avoids formation of precipitates. Clark et al. in British Pat. No. 445,711, issued Apr. 16, 1936, disclose that in 35–50% basic aluminum sulfate solutions containing 90 grams per liter of alumina, addition of phosphoric acid hinders the precipitation of insoluble basic sulfates. However, the temperatures of 70° C. to 80° C. employed by Clark et al limit the phosphate concentration to a low value. Murata in Japanese Pat. No. 74-40792, published Nov. 5, 1974, discloses a 10% basic polyaluminum sulfate containing 2 weight percent $PO_4$ and 7 weight percent $Al_2O_3$ German Pat. Nos. 2 612 503 issued Oct. 21, 1976 and 2 612 504 issued Oct. 21, 1976 disclose basic phosphate and sulfate-containing aluminum chloride solutions.

SUMMARY OF THE INVENTION

In accordance with the present invention aqueous solutions of the following phosphate stabilized polyaluminum sulfate compositions, useful as coagulants in water treatment, have the formula:

wherein
  x is about 1.2 to 1.62;
  y is about 0.595 to 0.87; and
  z is about 0.06 to 0.19
with the proviso that the sum of $x+2y+z$ is 3. Preferably the aqueous solutions are phosphate-stabilized polyaluminum sulfate about 1.2 to 2.7 molar.

The aqueous phosphate-stabilized polyaluminum sulfate solutions are prepared by reacting $Al_2O_3.nH_2O$ (aluminum hydrate) wherein n is at least about 3 with phosphoric acid, in a ratio of about 3 to 10 moles of $H_3PO_4$ per mole of $Al_2O_3.nH_2O$, thereby forming $Al(H_2PO_4)_3.n'H_2O$. The reaction product is then mixed with an aqueous polyaluminum sulfate solution to form the desired aqueous phosphate-stabilized polyaluminum sulfate solution. Alternatively, the product solutions can be prepared by reacting an aqueous overbasified polyaluminum sulfate phosphate solution with aqueous aluminum sulfate (alum) solution. The product solutions can be diluted with water and used as coagulants for water treatment.

DETAILED DESCRIPTION OF THE INVENTION

Generally speaking, the aqueous phosphate stabilized polyaluminum sulfate soltuions of this invention comprise solutions of a composition having the formula:

wherein
  x is about 1.2 to 1.62;
  y is about 0.595 to 0.87; and
  z is about 0.06 to 0.19
with the proviso that the sum $x+2y+z$ is 3.

The aqueous solutions are generally about 1.2 to 2.7 molar.

Preferred solutions are about 1.6 to 1.8 molar and preferably have compositions wherein
  x is about 1.3 to 1.34;
  y is about 0.76 to 0.8; and
  z is about 0.10 to 0.14
with the proviso that the sum $x+2y+z$ is 3.

In one aspect of the present invention, the aqueous phosphate-stabilized polyaluminum sulfate solutions are prepared by reacting $Al_2O_3.nH_2O$ (aluminum hydrate), wherein n is at least about 3 with phosphoric acid, in a ratio of about 3 to 10 moles of $H_3PO_4$ per mole of $Al_2O_3.nH_2O$, thereby forming $Al(H_2PO_4)_3.nH_2O$. The reaction product is then mixed with an aqueous polyaluminum sulfate solution to form the desired aqueous phosphate-stabilized polyaluminum sulfate solution.

Aqueous polyaluminum sulfate solutions, suitable for treatment with $Al(H_2PO_4)_3.n'H_2O$ to form the compositions of this invention, are obtainable by conventional processes. For example, such process can be based on reaction of aluminum sulfate solution with ground calcium carbonate followed by filtration to separate the precipitated gypsum formed.

Alternative processes for preparing the polyaluminum sulfate solutions include boiling the pure normal alum solution with freshly precipitated aluminum hydroxide and also dissolving natural minerals such as alunite $Al_2(OH)_4SO_4.7H_2O$.

Alternatively, the aqueous phosphate-stabilized polyaluminum sulfate solution may be prepared by reacting an aqueous phosphate-stabilized overbasified polyaluminum sulfate phosphate solution with an aqueous alum solution. The basicity of a phosphate stabilized polyaluminum sulfate solution is defined as $(100x/3)$. An overbasified solution is a solution having a higher basicity than the basicity desired in the product.

The desired intermediate basicity (35–45%) aqueous phosphate polyaluminum sulfate solution may be produced directly from phosphate containing alum solution and $CaCO_3$. Alternatively, an aqueous phosphate-stabilized overbasic polyaluminum sulfate solution can be produced, and then blended with the aluminum sulfate hydrate raw material to produce the desired product. In spite of economies of scale the latter route is industrially preferable both in terms of required net realizations, and of fixed capital requirements.

Preferably such solutions are gently heated to a temperature between about 30° C. and 70° C. and then cooled or they are aged at room temperature for at least one day and preferably from about 2 days to 10 days.

The physical stability of the aqueous phosphate-stabilized polyaluminum sulfate solutions is a function of solution basicity, phosphate level, and concentration. At very high concentrations of aluminum, solutions are unstable. It has been found that at low concentrations stability can also suffer, possibly caused by increased hydrolysis of aluminum complexes. It was surprisingly found that aging does not decrease stability of aqueous phosphate-stabilized polyaluminum sulfate solutions. A freshly prepared solution is as stable as a solution when held at 40° C. for 7 days.

The stable aqueous phosphate-stabilized polyaluminum sulfate solution, containing an equivalent of 10 weight percent $Al_2O_3$, of the present invention can be blended with alum or $AlCl_3$ to form a superior coagulant.

The solutions of the present invention can be used as a potable water coagulant and as a municipal wastewater coagulant. The solutions of the present invention can be applied to de-watering municipal wastewater and industrial wastewater sludges.

The coagulation properties of the compositions of the present invention remain stable with time and at high levels.

The chloride free solutions of the present invention are in many situations less corrosive than polyaluminum chloride solutions, both in storage, use and in manufacture.

Mol for mol, the aqueous phosphate stabilized basic polyaluminum sulfate solution is a far better coagulant than alum. Reduced dosage requirements of 30% are commonplace. In some natural waters reductions of 50% have been experienced. This means, among other things, reduced volumes of aluminum derived sludges in water treatment plants.

The aqueous phosphate stabilized basic polyaluminum sulfate solution is closely comparable in its effectiveness to polyaluminum chloride solution. A 45% basicity polyaluminum sulfate is comparable to a 70% basicity polyaluminum chloride while lower basicity polyaluminum chloride is not effective. Furthermore, overdosing of polyaluminum chloride is low alkalinity waters can reverse the clarification function. Aqueous phosphate-stabilized basic polyaluminum sulfate solution does not suffer this disadvantage.

EXAMPLE 1

This example illustrates the preparation of a physically stable aqueous phosphate-stabilized high basicity polyaluminum sulfate solution, as well as the preparation therefrom of blends with ordinary aluminum sulfate (commercial "alum") thereby forming a series of lower basic, high performance polyaluminum sulfate compositions.

I. Preparation of Stable Aqueous Phosphate-Stabilized High Basicity Polyaluminum Sulfate A convenient synthesis was based on the reaction of aluminum sulfate with ground calcium carbonate in the presence of phosphoric acid as represented by the equation below:

$Al(OH)_{0.08}(SO_4)_{1.46}$ + 0.81 $CaCO_3$ + 0.11 $H_3PO_4$
(commercial alum)
$Al(OH)_{1.59}(SO_4)_{0.65}(H_2PO_4)_{0.11}$ + 0.81 $CaSO_4 \cdot 2H_2O$ + 0.81 $CO_2$
(polyaluminum sulfate     (gypsum solids)
product in solution)

200.0 grams of commercial "dry alum" containing 17.1% $Al_2O_3$ with 2.7% basicity, and 8.5 grams of 85.2% $H_3PO_4$, were added to 187 grams of water in a Waring Blender. The mixture was stirred at a slow speed until as much as possible of the alum had dissolved. The degree of agitation was then increased to near maximum level and 54.8 grams of powdered calcium carbonate (99.2% $CaCO_3$) added a little at a time over a period of about 15 minutes. After all the $CaCO_3$ had been added, stirring was continued until the temperature of the resulting polyaluminum sulfate/gypsum slurry rose to about 40° C. and $CO_2$ evolution had ceased. The weight of the reaction mixture was adjusted to 425 grams by addition of a small amount of water as required. The gypsum solids were separated by filtration, yielding 280 grams of clear aqueous phosphate-stabilized polyaluminum sulfate product solution. Analysis of the product solution indicated:

10.29% $Al_2O_3$, 12.58% $SO_4$, 2.05% $PO_4$ by weight corresponding to a 53% phosphate-stabilized polyaluminum sulfate of the composition:

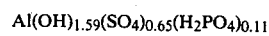

$Al(OH)_{1.59}(SO_4)_{0.65}(H_2PO_4)_{0.11}$

The product was heat treated in a rotating sealed container at 60° C. for one hour.

II. Physical Stability of the Aqueous Phosphate-Stabilized Polyaluminum Sulfate Product Solution The physical stability of the aqueous phosphate-stabilized basic polyaluminum sulfate product solution prepared as above was evaluated by (a) a dynamic test involving pumping and handling designed to simulate operations likely to be encountered in commercial transportation and use, and (b) a specially designed response to a seeding test described below.

II-A. Physical Stability Test Based on Seeding

This test was based on the response of the aqueous phosphate-stabilized basic polyaluminum sulfate solution to seeding by a specific crystalline basic aluminum sulfate which was found to be characteristic of the solid phase which deposits from metastable polyaluminum sulfate solutions on self-destabilization over a wide range of basicities (>25%). The seed had the composition 5 $Al_2O_3 \cdot 6SO_3 \cdot 24H_2O$ with a well-defined x-ray diffraction pattern and hydrated rapidly in aqueous polyaluminum sulfate to the 40 hydrate, a compound characterized by Bassett and Goodwin (J. Chem. Soc. 1949, page 2248). The response to the seed was monitored by periodic turbidity measurements of the continuously rotated sample following innoculation as described below:

Approximately 20 ml of the aqueous phosphate-stabilized polyaluminum sulfate sample were transferred into a clear glass serum ampule whose cylindrical portion was 7.5 cm in length and 2.0 cm in diameter. Approximately 2 milligrams of the basic aluminum sulfate seed crystal, ground to −325 mesh, was introduced into the aqueous phosphate-stabilized polyaluminum sulfate solution and the ampule sealed with a tightfitting rubber closure (or flamesealed). The seed was dispersed throughout the sample by manual shaking and an initial turbidity measured by a suitable instrument, e.g. the Hach Model 2100A nephelometer. The ampule was then subjected to a continuous cyclic up-ending as by attachment to the wheel of a ColeParmer Model 7637 Rotator.

Periodic turbidity measurements were recorded daily or more frequently for samples obviously destabilizing rapidly.

The above test was used for the evaluation of various aqueous phosphate-stabilized polyaluminum sulfate solutions, some of which were prepared from reagent alum and others from commercial alum. The former were colorless, while the latter had a light brown color attributable to certain associated impurities or combinations thereof (e.g. iron and organic matter). It was observed during seeding tests that the color of the commercial preparations significantly reduced the turbidity readings compared with comparable reagent counterpart compositions with visually identical turbidities. This precluded direct comparisons of commercial and reagent turbidity data.

Table 1 below presents the seed response data obtained for the aqueous phosphate-stabilized polyaluminum sulfate solution prepared as in I above.

TABLE 1

|  | Turbidity, FTU* | |
|---|---|---|
|  | Measured Value | Incremental Turbidity Induced by Seeding |
| Sample before seeding | 3.0 | — |
| Sample immediately after seeding | 3.6 | 0.0 |
| Sample 1 day after seeding | 3.8 | 0.2 |
| Sample 3 days after seeding | 4.2 | 0.6 |
| Sample 6 days after seeding | 4.6 | 1.0 |
| Sample 10 days after seeding | 5.0 | 1.4 |
| Sample 14 days after seeding | 5.4 | 1.8 |
| Sample 16 days after seeding | 5.6 | 2.0 |
| Sample 20 days after seeding | 6.2 | 2.6 |
| Sample 30 days after seeding | 6.5 | 2.9 |

*Formazin turbidity units

These data indicated a very slow response to seeding and thereby confirmed the results of a dynamic stability test mentioned above which indicated a high degree of physical stability for aqueous phosphate-stabilized polyaluminum sulfate solutions of this composition.

III. Preparation of Other Polyaluminum Sulfate Compositions from Aqueous Phosphate-Stabilized High Basicity Polyaluminum Sulfate Solutions By Reacting with Alum Although the aqueous phosphate-stabilized polyaluminum sulfate solution product prepared as described in I above exhibits adequate physical stability, its performance as a coagulant was not significantly better than ordinary alum. However, this aqueous phosphate-stabilized polyaluminum sulfate can readily be blended with ordinary alum (which can be considered as zero or low basicity polyaluminum sulfate) to form aqueous phosphate-stabilized polyaluminum sulfate compositions of lower basicity and higher performance.

The first series of aqueous phosphate-stabilized polyaluminum sulfate solution compositions thus prepared were made by blending the aqueous phosphate-stabilized polyaluminum sulfate solution of I. with alum liquor (8.26% $Al_2O_3$) and water to form a series ranging from about 6 to 8% $Al_2O_3$ and 32 to 45% basic. The water was included to hold down the $Al_2O_3$ concentration and help offset the resulting reduced phosphate/aluminum ratio of the blends, which could affect the physical stability. The effect of $Al_2O_3$ concentration and $PO_4/Al$ ratio on physical stability is shown in Table 4.

A commercial alum liquor containing 8.26% $Al_2O_3$ was mixed with an equal weight of water.

Aqueous phosphate-stabilized polyaluminum sulfate solution from I. was blended with various proportions of the diluted alum liquor to produce the aqueous phosphate-stabilized polyaluminum sulfate solution compositions shown in Table 3. The aqueous phosphate-stabilized polyaluminum sulfate solution was added dropwise to the vigorously stirred alum solution in all cases.

TABLE 3

| Blend | 1 | 2 | 3 | 4 | 5 | 6 |
|---|---|---|---|---|---|---|
| Parts by weight aqueous phosphate-stabilized polyaluminum sulfate from I. | 100.0 | 100.0 | 100.0 | 100.0 | 100.0 | 100.0 |
| Parts by weight diluted alum | 172.6 | 139.6 | 111.2 | 86.2 | 65.4 | 46.6 |
| % Basicity | 32.5 | 35.0 | 37.5 | 40.0 | 42.5 | 45.0 |
| % $Al_2O_3$ | 6.39 | 6.70 | 7.05 | 7.43 | 7.85 | 8.33 |
| % $PO_4$ (on 10 weight percent $Al_2O_3$ basis) | 1.14 | 1.24 | 1.35 | 1.44 | 1.54 | 1.63 |

The blends were evaluated for physical stability and coagulation performance.

IV. Physical Stability and Coagulation Performance of PAS Compositions Formulated by Blending IV-A Physical Stability Data covering the response to seeding by the test outlined above in II-A are presented in Table 4 below

TABLE 4

SEED RESPONSE OF AQUEOUS PHOSPHATE-STABILIZED POLYALUMINUM SULFATE SOLUTION/ALUM BLENDS

|  | Turbidity (F.T.U.) | | | | | | | | | | | |
|---|---|---|---|---|---|---|---|---|---|---|---|---|
|  | 1 | | 2 | | 3 | | 4 | | 5 | | 6 | |
| Blend | A | B | A | B | A | B | A | B | A | B | A | B |
| Immediately after seeding | 3.4 | 0.0 | 3.2 | 0.0 | 3.6 | 0.0 | 3.3 | 0.0 | 3.2 | 0.0 | 3.4 | 0.0 |
| 1 day after seeding | 4.7 | 1.3 | 5.0 | 1.8 | 6.2 | 2.6 | 6.5 | 3.2 | 7.5 | 4.3 | 6.7 | 3.3 |
| 2 days after seeding | 5.7 | 2.3 | 6.2 | 3.0 | 7.2 | 3.6 | 8.2 | 4.9 | 8.9 | 5.7 | 8.1 | 4.7 |
| 5 days after seeding | 6.2 | 2.8 | 7.0 | 3.8 | 7.7 | 4.1 | 8.3 | 5.0 | 10.2 | 7.0 | 8.4 | 5.0 |
| 7 days after seeding | 6.8 | 3.4 | 7.5 | 4.3 | 8.6 | 5.0 | 9.0 | 5.7 | 10.8 | 7.6 | 8.8 | 4.4 |

A - Measured value of turbidity.
B - Incremental turbidity induced by seeding.

TABLE 5

COAGULATION PERFORMANCE OF AQUEOUS PHOSPHATE-STABILIZED POLYALUMINUM SULFATE SOLUTION/ALUM BLENDS DESCRIBED IN TABLE 3

| Blend | 1 | 2 | 3 | 4 | 5 | 6 |
|---|---|---|---|---|---|---|
| I. WATER TEMPERATURE 68° F. | | | | | | |
| Residual Turbidity: | | | | | | |
| Blend as Prepared | 12 | 12 | 13 | 12 | 13 | 11 |
| Blend Aged 1 Day at Room Temp. | 10 | 9.2 | 9 | 8.4 | 9 | 9 |
| Blend Heat Treated 60° C./1 Hr. After Aging 1 Day at Room Temp. | 8 | 7.6 | 7.4 | 6.8 | 7.5 | 7 |
| Alum (reference) | 14 | | | | | |
| II. WATER TEMPERATURE 38° F. | | | | | | |
| Blend as Prepared | 11.6 | 10.5 | 12.3 | 11.5 | 11.5 | 11.0 |
| Blend Aged 1 Day | | | | | | |

TABLE 5-continued
COAGULATION PERFORMANCE OF AQUEOUS PHOSPHATE-STABILIZED POLYALUMINUM SULFATE SOLUTION/ALUM BLENDS DESCRIBED IN TABLE 3

| Blend | 1 | 2 | 3 | 4 | 5 | 6 |
|---|---|---|---|---|---|---|
| at Room Temp. | 9.6 | 8.8 | 8.8 | 8.0 | 8.2 | 8.2 |
| Blend Heat Treated 60° C./1 Hr. After Aging 1 Day at Room Temp. | 9.0 | 8.4 | 8.4 | 7.2 | 7.2 | 7.6 |
| Alum (reference) | 19 | | | | | |

TABLE 6
DOSAGE REQUIREMENT DATA - AQUEOUS PHOSPHATE-STABILIZED POLYALUMINUM SULFATE SOLUTION/ALUM BLEND #3 DESCRIBED IN TABLE 3.

| Dosage (PPM Alum Equivalent) | 6.5 | 13.0 | 19.5 | 26.0 |
|---|---|---|---|---|
| Residual Turbidity: | | | | |
| Blend 3 | 4.8 | 1.6 | 0.8 | 0.6 |
| Alum (reference) | 11.0 | 2.3 | 1.3 | 0.8 |

These data show a generally greater response to seeding than that shown by the parent aqueous phosphate-stabilized basic polyaluminum sulfate solution component.

IV-B Coagulation Performance

The coagulation performance of various aqueous phosphate-stabilized polyaluminum sulfate solution compositions were evaluated by two types of coagulation tests:

(a) a selected single dose comparison with alum and Japanese polyaluminum chloride as reference standards, based on the extent of turbidity removal from a turbid water synthesized from tap water and hydraulically fractionated colloidal clay. The test is based on a widely used "jar test" similar to the procedure described in ASTM D 2035. A sample of the turbid water is treated with a measured dose of the coagulant being tested, the water is stirred rapidly, then slowly for specified time periods, and the mixture finally allowed to settle. A sample of the settled water is withdrawn at a specified depth after settling for a specified period, and the residual turbidity measured nephelometrically. The extent to which the original turbidity has been reduced is a measure of the effectiveness of the coagulant.

(b) a relative dosage requirement for an arbitrary degree of turbidity removal (e.g. 90%) compared with alum, determined from dosage curves relating residual turbidity and dosage.

The single dose performance data are presented in Table 5. The data represent the residual turbidity resulting from treatment of a synthetic turbid water (initial turbidity 21 F.T.U., initial pH 8.0) with the quantity of coagulant containing $Al_2O_3$ equivalent to 6.5 ppm of alum $(Al_2(SO_4)_3 \cdot 14H_2O)$, at water temperatures of 20° C. and 3° C.

It was observed that the coagulation properties of the blends soon after preparation were poorer than expected from previous data for compositions of these basicities. This was confirmed by the significantly improved coagulation properties following storage of the blends for a single day at ambient temperatures, as presented in Table 5. The one-day old blends were then heat treated at 60° C. for 1 hour, resulting in the further improved coagulation performance values shown in Table 5.

The dosage data are presented in Table 6, and were obtained on a synthetic turbid water with initial turbidity 10 F.T.U., initial pH 8.0. The data indicate that a turbidity removal of 90% (residual turbidity=1.0) required 22.5 ppm of ordinary alum and 17.0 ppm (expressed as equivalent alum) of Blend 3, corresponding to a 25% reduction in coagulant requirement compared to alum.

EXAMPLE 2

This example shows the preparation of a second series of blends from a more highly phosphated high basicity polyaluminum sulfate and alum for the purpose of forming lower basic, higher performance polyaluminum sulfate compositions while at the same time providing some extra phosphate to enhance the physical stability of the resulting blends. Note that in Example 1 the reduced PO4/Al ratio in the blends led to a reduction in physical stability.

I. Preparation of More Highly Phosphated Polyaluminum Sulfate for Use as a Blending Component The aqueous phosphate-stabilized basic polyaluminum sulfate solution composition in this example was prepared by the simple addition of the appropriate amount of phosphoric acid to the polyaluminum sulfate prepared in previous example, in accordance with the equation:

$$Al(OH)_{1.59}(SO_4)_{0.65}(H_2PO_4)_{0.11} + 0.05 H_3PO_4 Al(OH)_{1.54}(SO_4)_{0.65}(H_2PO_4)_{0.16} + 0.05 H_2O$$

Analysis indicated the composition to be:

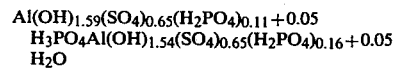

10.16% $Al_2O_3$, 51.1% Basicity, 3.05% $PO_4$.

II. Preparation of Other Polyaluminum Sulfate Compositions From Highly Phosphated Polyaluminum Sulfate by Blending with Alum The aqueous phosphate-stabilized polyaluminum sulfate solution prepared as in I above was blended with various proportions of 1:1 (weight ratio) alum liquor as in the previous Example A. The polyaluminum sulfate compositions thus produced are shown in Table 7.

TABLE 7

| Blend | 1 | 2 | 3 | 4 | 5 | 6 |
|---|---|---|---|---|---|---|
| Parts by weight polyaluminum sulfate from I | 100.0 | 100.0 | 100.0 | 100.0 | 100.0 | 100.0 |
| Parts by weight diluted alum | 156.0 | 124.5 | 97.5 | 74.1 | 53.7 | 35.8 |
| % Basicity | 32.5 | 35.0 | 37.5 | 40.0 | 42.5 | 45.0 |
| % $Al_2O_3$ | 6.48 | 6.82 | 7.18 | 7.59 | 8.05 | 8.57 |
| % $PO_4$ (on 10% $Al_2O_3$ basis) | 1.84 | 1.99 | 2.16 | 2.31 | 2.46 | 2.63 |

The phosphate levels with respect to contained aluminum are significantly higher in this series of blends compared with those of Example 1. Each of the blends were split into two portions so that the effect of aging at room temperature and heat treatment on their coagulation properties could be evaluated.

III. Evaluation of Physical Stability and Coagulation Performance

The blends were evaluated by the test procedures outlined in Example 1.

III-A Physical Stability

Data covering the response to seeding are presented in Table 8 below:

TABLE 8

SEED RESPONSE OF AQUEOUS PHOSPHATE-STABILIZED BASIC POLYALUMINUM SULFATE SOLUTION/ALUM BLENDS

| | Turbidity (F.T.U.) | | | | | |
|---|---|---|---|---|---|---|
| | 1 | | 2 | | 3 | |
| Blend | A | B | A | B | A | B |
| Immediately after seeding | 3.4 | 0.0 | 3.6 | 0.0 | 3.6 | 0.0 |
| 1 day after seeding | 3.9 | 0.5 | 4.0 | 0.4 | 4.0 | 0.4 |
| 4 days after seeding | 4.2 | 0.8 | 4.4 | 0.8 | 4.3 | 0.7 |
| 7 days after seeding | 4.3 | 0.9 | 4.6 | 1.0 | 4.3 | 0.7 |
| | 4 | | 5 | | 6 | |
| Blend | A | B | A | B | A | B |
| Immediately after seeding | 3.4 | 0.0 | 3.8 | 0.0 | 3.6 | 0.0 |
| 1 day after seeding | 4.1 | 0.7 | 4.2 | 0.4 | 3.8 | 0.2 |
| 4 days after seeding | 4.6 | 1.2 | 5.0 | 1.2 | 4.0 | 0.4 |
| 7 days after seeding | 4.6 | 1.2 | 4.8 | 1.0 | 4.0 | 0.4 |

A - Measured value of turbidity.
B - Incremental turbidity induced by seeding.

TABLE 9

COAGULATION PERFORMANCE OF AQUEOUS PHOSPHATE-STABILIZED BASIC POLYALUMINUM SULFATE SOLUTION/ALUM BLENDS DESCRIBED IN TABLE 7

| Blend | 1 | 2 | 3 | 4 | 5 | 6 |
|---|---|---|---|---|---|---|
| I. WATER TEMPERATURE 20° C. | | | | | | |
| Residual Turbidity: | | | | | | |
| Blend as Prepared | 8.6 | 8.8 | 9.0 | 9.0 | 8.6 | 9.0 |
| Blend Aged 1 Day at Room Temp. | 8.0 | 8.0 | 7.4 | 8.0 | 7.1 | 7.6 |
| Blend Heat Treated 60° C./1Hr. After Aging 1 Day at Room Temp. | 7.0 | 6.4 | 6.8 | 6.8 | 6.0 | 7.0 |
| Alum (reference) | 14 | | | | | |
| II. WATER TEMPERATURE 3° C. | | | | | | |
| Blend as Prepared | 9.2 | 9.6 | 9.0 | 8.6 | 9.2 | 10.0 |
| Blend Aged 1 Day at Room Temp. | 8.0 | 8.4 | 8.0 | 8.0 | 7.6 | 8.0 |
| Blend Heat Treated 60° C./1Hr. After Aging 1 Day at Room Temp. | 8.6 | 9.2 | 7.4 | 7.2 | 7.2 | 7.6 |
| Alum (reference) | 19 | | | | | |

In contrast to the corresponding blends of Example 1, these data indicate a relatively low response to seed, comparable to that, for example, of the highly basic polyaluminum sulfate component used for preparing the blends of Example 1. This attests to the high order of physical stability of the blends of this Example 2, since the physical stability of the aqueous phosphate-stabilized basic polyaluminum sulfate solution component of the previous example was confirmed by the independent dynamic test method described earlier.

III-B Coagulation Performance

The coagulation properties of the blends were evaluated by the test procedures outlined in Example 1.

The single dose performance data are presented in Table 9. The data represent the residual turbidity resulting from treatment of a synthetic turbid water (initial turbidity 21 F.T.U., pH 8.0) with the quantity of coagulant containing $Al_2O_3$ equivalent to 6.5 ppm of alum, at water temperatures of 20° C. and 3° C.

As for the blends of Example 1, the effect of equilibration, as by storage at room temperature or as accelerated by heat treatment, are stated in Table 9.

The dosage requirements are presented in Table 10 and were obtained on a synthetic turbid water with initial turbidity 5 F.T.U., initial pH 7.0.

TABLE 10

DOSAGE REQUIREMENT OF AQUEOUS PHOSPHATE-STABILIZED POLYALUMINUM SULFATE SOLUTION/ALUM BLEND #3 DESCRIBED IN TABLE 7.

| Dosage (PPM Alum Equivalent) | 5 | 10 | 15 | 20 |
|---|---|---|---|---|
| Residual Turbidity: | | | | |
| Blend 3 | 2.7 | 0.7 | 0.4 | 0.3 |
| Alum (reference) | 3.8 | 1.0 | 0.7 | 0.5 |
| Japanese Polyaluminum Chloride (reference) | 1.2 | 0.5 | 0.3 | 0.25 |

The data indicate that a turbidity removal of 90% (residual turbidity =0.5) required 20.0 ppm of ordinary alum and 13.0 ppm (expressed as equivalent alum) of Blend 3, corresponding to a 35% reduction in coagulant requirement compared to alum.

EXAMPLE 3

This example illustrates the preparation of stable, high performance aqueous phosphate-stabilized polyaluminum sulfate/chloride solutions by blending a phosphated high basicity polyaluminum sulfate with aluminum chloride.

The aqueous phosphate-stabilized polyaluminum sulfate solution used was the aqueous phosphate-stabilized basic polyaluminum sulfate solution product prepared as described in Example 1 under I, namely a 53% basic polyaluminum sulfate containing 10.29% $Al_2O_3$ and 2.05% $PO_4$.

Two polyaluminum sulfate/chloride compositions were prepared by blending the aqueous phosphate-stabilized polyaluminum sulfate solution with the appropriate quantities of an aqueous solution of $AlCl_3$ containing 4.20% $Al_2O_3$/basicity zero. The aqueous phosphate-stabilized polyaluminum sulfate solution was added dropwise to the stirred $AlCl_3$ solution in both cases.

Blend 1—35% Basic 100.0 parts by weight of aqueous phosphate-stabilized polyaluminum sulfate solution 124.7 parts by weight of $AlCl_3$ solution yielding a product of the empirical composition:

$$Al(OH)_{1.05}Cl_{1.02}(SO_4)_{0.43}(H_2PO_4)_{0.07}$$

containing 6.91% $Al_2O_3$, 5.60% $SO_4$, 4.87% Cl, 0.91% $PO_4$.

Blend 2—45% Basic 100.0 parts by weight of aqueous phosphate-stabilized polyaluminum sulfate solution 42.6 parts by weight of AlCl$_3$ solution yielding a product of the empirical composition:

$$Al(OH)_{1.35}Cl_{0.45}(SO_4)_{0.55}(H_2PO_4)_{0.09}$$

containing 8.47% Al$_2$O$_3$, 8.82% SO$_4$, 2.62% Cl, 1.43% PO$_4$.

I. Physical Stability of Aqueous Phosphate-Stabilized Polyaluminum Sulfate Solution/AlCl$_3$ Blends The seed response test on Blends 1 and 2 led to the unexpected observation that the seed actually dissolve in these solutions showing the stability of these blends. In contrast, the Taki patent composition responded very strongly to the seed, demonstrating the strong stabilizing effect of phosphate on mixed sulfate/chloride systems.

The seed response data are presented in the Table 11 below:

TABLE 11

| | Turbidity F.T.U. | | |
|---|---|---|---|
| | Blend 1 | Blend 2 | Taki Patent Composition* |
| Before seeding | 2.8 | 2.6 | 1.5 |
| Immediately after seeding | 4.0 | 3.6 | 2.5 |
| 1 day after seeding | 2.8 | 2.6 | 170 |
| 2 days after seeding | 2.8 | 2.6 | 700 |
| 5 days after seeding | 2.8 | 2.6 | >1000 |
| 7 days after seeding | 2.8 | 2.6 | >1000 |

*Prepared by adding 48% basic polyaluminum sulfate to AlCl$_3$ solution - product is 37% basic and contains 9.0% Al$_2$O$_3$ (contains no phosphate).

II. Coagulation Properties of Aqueous Phosphate-Stabilized Polyaluminum Sulfate Solution/AlCl$_3$ Blends The coagulation performance of the blends was evaluated by the single dose method as a function of aging at room temperature and heat treatment at 60° C./1 hour.

The data are presented in Table 12 and represent the residual turbidity resulting from treatment (with a dose corresponding to 6.5 ppm alum equivalent) of a synthetic turbid water whose initial turbidity was 21 F.T.U. and pH 8.0, at two water temperatures (20° C., 3° C.).

TABLE 12

| | Residual Turbidity | | |
|---|---|---|---|
| | Blend 1 (35% basic) | Blend 2 (45% basic) | Alum |
| I. Water Temp., 20° C. | | | |
| Blend as prepared | 10.0 | 12.0 | 14.0 |
| Blend after aging 1 day | 7.5 | 8.9 | 14.0 |
| Blend after aging 2 days | 7.3 | 8.5 | 14.0 |
| Blend after aging 7 days | 7.0 | 7.2 | 14.0 |
| Blend after heat treating (60° C./1 hour) | 7.3 | 6.5 | 14.0 |
| II. Water Temp., 3° C. | | | |
| Blend as prepared | 7.5 | 12.4 | 19.0 |
| Blend after aging 1 day | 7.7 | 10.6 | 19.0 |
| Blend after aging 2 days | 7.3 | 7.3 | 19.0 |
| Blend after aging 7 days | 7.3 | 7.0 | 19.0 |
| Blend after heat treating (60° C./1 hour) | 7.0 | 6.5 | 19.0 |

The coagulation data again indicate the effect of aging or heat treating the blends to equilibrate them structurally and the resulting improvement of their coagulation properties.

We claim:

1. An aqueous chloride-free, phosphate-stabilized polyaluminum sulfate solution, useful as a coagulant in water treatment, having the formula:

$$Al(OH_x)(SO_4)_y(H_2PO_4)_z$$

wherein
x is about 1.2 to 1.62;
y is about 0.595 to 0.87; and
z is about 0.06 to 0.19,
with the proviso that the sum of x+2y+z is 3.

2. The solution as set forth in claim 1 wherein the solution is about 1.2 to 2.7 molar.

3. The solution as set forth in claim 1 wherein x is about 1.3 to 1.34.

4. The solution as set forth in claim 1 wherein y is about 0.76 to 0.8.

5. The solution as set forth in claim 1 wherein z is about 0.10 to 0.14.

6. The solution as set forth in claim 1 with a turbidity after seeding of less than about 3 Formazin turbidity units for over at least seven days.

7. The solution as set forth in claim 1 having a composition of the formula $$Al(OH)_{1.3-1.34}(SO_4)_{0.76-0.8}[H_2PO_4]_{0.1-0.14}.$$

8. A process for preparing an aqueous chloride-free, phosphate stabilized polyaluminum sulfate solution, useful as a coagulant in water treatment, having the formula:

$$Al(OH_x)(SO_4)_y(H_2PO_4)_z$$

wherein
x is about 1.2 to 1.62;
y is about 0.595 to 0.87; and
z is about 0.06 to 0.19,
comprising blending an overbasified aqueous chloride-free phosphate-stabilized polyaluminum sulfate solution with an aqueous chloride-free, alum solution, with the proviso that the sum of x+2y+z is 3.

9. The process as set forth in claim 8 comprising the additional step of heating the solution to a temperature of from about 30° to about 70° C.

10. The process as set forth in claim 8 wherein the solution is allowed to stand for at least 1 day before use as a coagulant.

11. The process as set forth in claim 8 wherein
x is about 1.3 to 1.34;
y is about 0.76 to 0.8; and
z is about 0.1 to 0.14.

12. The process as set forth in claim 8 wherein the aqueous phosphate-stabilized polyaluminum sulfate solution is from about 1.6 to about 2.7 molar.

13. A process for preparing an aqueous chloride-free, phosphate-stabilized polyaluminum sulfate solution, useful as a coagulant in water treatment, of a composition having the formula:

$$Al(OH)_x(SO_4)_y(H_2PO_4)_z$$

wherein
x is about 1.2 to 1.62;
y is about 0.595 to 0.87; and
z is about 0.06 to 0.19
which comprises:

reacting Al$_2$O$_3$·nH$_2$O, wherein n is at least 3, with chloride-free phosphoric acid, in a ratio of about 3 to 10 moles of H$_3$PO$_4$ per mole of Al$_2$O$_3$·nH$_2$O; and mixing the resultant reaction product with an aqueous chloride-free polyaluminum sulfate solution, with the proviso that the sum of x+2y+Z is 3.

14. The process as set forth in claim 8 wherein the aqueous phosphate-stabilized polyaluminum sulfate solution is from about 1.2 to about 2.7 molar.

15. A process for preparing aqueous phosphate-stabilized polyaluminum sulfate/chloride solutions, useful as a coagulant in water treatment, comprising blending an aqueous chloride-free phosphate-stabilized polyaluminum sulfate solution of a composition having the formula Al(OH)$_x$(SO$_4$)$_y$(H$_2$PO$_4$)$_z$ wherein
x is about 1.2 to 1.62;
y is about 0.595 to 0.87; and
z is about 0.06 to 0.19
with the proviso that the sum x+2y+7 is 3, with an aqueous aluminum trichloride solution.

* * * * *

UNITED STATES PATENT AND TRADEMARK OFFICE
CERTIFICATE OF CORRECTION

PATENT NO. : 4,284,611
DATED : August 18, 1981
INVENTOR(S) : Alan B. Gancy and Christian A. Wamser It is certified that error appears in the above-identified patent and that said Letters Patent are hereby corrected as shown below:

Col. 1, line 37, in the formula: "AL" should read -- Al --

Col. 3, line 31: "is" should read -- in --

Col. 13, line 7: "8" should read -- 13 --

Col. 14, line 11, in the formula: "7" should read -- z --

Signed and Sealed this

First Day of December 1981

[SEAL]

Attest:

Attesting Officer

GERALD J. MOSSINGHOFF

Commissioner of Patents and Trademarks